United States Patent [19]
Loft et al.

[11] 3,928,705
[45] Dec. 23, 1975

[54] DIELECTRIC INSULATION EMPLOYING OPEN-CELLED MICROPOROUS FILM

[75] Inventors: John T. Loft, Springfield, N.J.; John A. McTaggart, Erie, Pa.; Steven G. Plovan, Livingston, N.J.

[73] Assignee: Celanese Corporation, New York, N.Y.

[22] Filed: Feb. 12, 1973

[21] Appl. No.: 331,843

Related U.S. Application Data

[63] Continuation of Ser. No. 134,423, April 15, 1971, abandoned.

[52] U.S. Cl. .................. 428/311; 427/58; 427/79; 427/119; 427/372; 29/25.42; 156/52; 252/63.2
[51] Int. Cl.² .................. B44D 1/18; B44D 1/44
[58] Field of Search ............... 117/62, 98, 113, 232; 174/25 R, 36, 121 SR; 317/258; 428/310, 311, 313; 427/58, 79, 119, 372; 29/25.42

[56] References Cited
UNITED STATES PATENTS

| | | | |
|---|---|---|---|
| 3,363,156 | 1/1968 | Cox | 317/258 |
| 3,426,754 | 2/1969 | Bierenbaum et al. | 117/122 P |
| 3,427,394 | 2/1969 | McKean | 174/25 R |
| 3,429,983 | 2/1969 | Hofmeier | 174/25 R |
| 3,459,871 | 8/1969 | Eager et al. | 174/25 R |
| 3,477,084 | 11/1969 | Thomas | 174/25 R |
| 3,509,266 | 4/1970 | Endacott | 174/25 R |
| 3,573,575 | 4/1971 | Brady | 117/113 |
| 3,585,552 | 6/1971 | Feather et al. | 117/25 R |
| 3,594,489 | 7/1971 | Katz et al. | 174/25 R |
| 3,609,207 | 9/1971 | Maschio | 174/25 R |
| 3,637,415 | 1/1972 | Civarde | 117/62 |
| 3,715,639 | 2/1973 | Gaines et al. | 317/258 |

*Primary Examiner*—Michael Sofocleous

[57] ABSTRACT

An electrical conductor having a dielectric insulation material formed from a partially heat-shrunk open-celled microporous film is disclosed. The dielectric insulation material is impregnated with a dielectric liquid selected from halogenated organic compounds having from 1 to 5 halogen substituents and from 1 to 3 aryl groups; perfluorobutylamines and ethers; perfluorohydrocarbons; silicone oils; mineral oils; castor oil and cottonseed oil.

4 Claims, No Drawings

DIELECTRIC INSULATION EMPLOYING OPEN-CELLED MICROPOROUS FILM

This is a continuation of application Ser. No. 134,423, filed Apr. 15, 1971, now abandoned.

BACKGROUND OF THE INVENTION

1. Field of the Invention

The present invention relates to novel and improved electrical insulation procursor materials of inherently high dielectric characteristics, appropriate for high power electrical applications, capable of being impregnated with dielectric fluids, and heat-shrunk to incapsulate said fluids prior to its use in electrical units as cable insulation; dielectric capacitor spacers; etc. and to methods of producing same.

2. Description of the Prior Art

Despite the advances over the years in the development of plastic or synthetic film materials for electrical insulation, a completely practical design has not been attained for units such as high voltage cables and condensers having all-synthetic tape insulation. Among the reasons for this are the number of problems associated with impregnation, degree of impregnation, and compatability with impregnants and the fact that the mechanics of manufacture of these all-synthetic films are more difficult than with paper tape.

Moreover, with reference to cable insulation, synthetic film tape can impose limitations in cable-core flexibility during handling and reeling and reserve electrical stability of such oil-impregnated cable systems, under loss of operating pressure, is usually markedly reduced as compared to cable insulated with paper tape.

Condensers utilizing synthetic film dielectric spacers also have a tendency to perform poorly for the air spaces present in the assembly, i.e. air entrained within the windings and inherent in the voids and cracks within the film, lead to lower breakdown voltages and humidity resistance.

Of course, synthetic resin materials are known to have extremely high intrinsic (small area) dielectric strength. For example, impregnated polypropylene film has an operable dielectric strength of over 1200 volts/mil, although its intrinsic dielectric strength may be over 20,000 volts/mil, based on an area of about 0.01 square inches. Impregnated paper, the most common dielectric material presently used in A-C capacitors, has an operable strength of about 400 volts per mil. Also, the Volumetric Efficiency in microfarads per cubic inch of dielectric spacer to be expected for an all-resin spacer is about 0.36 as opposed to about 0.14 for an all-paper composition.

Impregnated dielectric films exhibit significant dielectric properties in three categories, i.e. increased dielectric strength, low energy loss and high corona start voltage (CSV) by reason of impregnation characteristics. Increased dielectric strength is important because it provides a more efficient dielectric and also permits the use of a smaller volume or weight of dielectric material to withstand a given voltage in a system. Energy loss is important since energy loss in the system adversely affects the electrical efficiency of the unit and may cause physical deterioration of the structural materials of the unit due to the conversion of the dissipated energy into heat. Impregnation is most important to prevent the formation of corona discharge in a solid dielectric and so is an essential consideration.

The electrostatic capacitor art has long recognized that capacity per unit volume could be improved by filling the inter-electrode space in a capacitor with materials, notably liquids, of high dielectric constant. The most efficient use of a high dielectric constant liquid in a capacitor occurs, moreover, when the motion of its ions in an alternating field is impeded by the presence of solid boundaries, such as either the electrodes themselves, or by walls of the pores of a porous spacer matrix. The ions responsible for electrical conductivity only contribute to electrical losses if the extent of motion of these ions under the influence of an AC field is less than the distance between the electrodes or fixed solid boundaries. If the distance between the electrodes or these boundaries is much less than the excursion, or extent of motion of the ions, then the ions are surface immobilized during a large part of the AC cycle and thus do not give rise to losses, because the conductivity occasioned by ionization by collision has been avoided.

Numerous and diverse methods have been utilized to approach the impregnated dielectric insulation situation as idealized above.

The use of a porous resin insulation matrix has been deemed essential because of the aforementioned reasons and because of the commercially unfeasible times necessary to approach complete impregnation of a non-porous synthetic film. This is illustrated by noting that an impregnation process, which is an example of essentially complete impregnation involving non-porous polypropylene film, with Pyranol 1499 (a General Electric Trademark) dielectric impregnant at a temperature of about 90°C. takes from about 6 to 20 days to achieve relatively stable conditions wherein about 11% by weight of the liquid is taken up by the polypropylene.

In U.S. Pat. No. 2,738,453 a polyvinyl acetal resin emulsion is used to fill the space between electrodes in a capacitor assembly. Thereafter, the dispersing medium is removed by heat and/or vacuum and the particles of the resin sintered together to form a porous spacer. It is also suggested that the porosity of the resin mass may be increased by mixing a foam-producing agent with the liquid resin.

U.S. Pat. No. 3,427,394 illustrates primary cable insulation which consists of a very thin layer of polyester sheet, having bonded to it a thicker layer of low density paper made of a combination of plastic and cellulose. The polyester tape serves as a carrier to support the low density paper which by itself would be too weak to wind satisfactorily on a cable core. A shield tape assembly is applied over the insulation and the unit oil impregnated and enclosed within an impervious oil-filled sheath.

The polyester carrier sheets such as that previously described are often perforated to provide oil channels between the layers of the porous paper to enhance the oil penetration and impregnation process throughout the dielectric. The perforated areas are usually uniformly distributed and restricted to 10% or less of the virgin tape.

Porous dielectric insulation films have also been prepared as in U.S. Pat. No. 3,015,051 by casting a solution of a resin such as cellulose nitrate in methyl isobutyl ketone on the surface of a liquid such as water, and transferring same to a vertically held support foil by allowing the supporting liquid to drain. Impregnation was accomplished by either vacuum impregnation or by dipping the film coated foil into a delectric liquid.

Noting that polytetrafluoroethylene film is a good dielectric material combining exceptional low electrical loss with good thermal stability, Peck et al. in U.S. Pat. No. 2,790,999 by "mechanically disrupting" and tearing the film in a stretching process below 70°C., produced a thin polytetrafluoroethylene film which, with dielectric liquid impregnation, was capable of being utilized in electrical capacitors.

All solutions heretofore mentioned to the dielectric insulation situation possess at least one of two inherent disadvantages: (1) extremely long dielectric liquid impregnation times and/or (2) open channel matrix supports necessitating in situ dielectric liquid impregnation.

SUMMARY OF THE INVENTION

Accordingly, an object of the present invention is to provide an improved all-synthetic dielectric insulator matrix capable of being rapidly impregnated with a dielectric liquid and heat shrunk to totally entrap said liquid.

Another object of the instant invention is to provide electrical insulation which can utilize liquids of high dielectric constant without suffering the high electrical losses usually associated therewith.

Another object is to obviate the necessity of an in situ impregnation of electrically insulated system.

An additional object is to provide a void free, all-synthetic dielectric insulator with a dielectric liquid uniformly distributed and encapsulated within pores, the diameter of which is much less than the excursion distance of the ions of the dielectric liquid.

Other and further objects of the present invention will be apparent to those skilled in the art from the following:

DETAILED DESCRIPTION OF THE INVENTION

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

The microporous films useful in the present invention are also characterized by a reduced bulk density, sometimes hereinafter referred to simply as a "low" density. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross volume is determined by immersing a known weight of the film in a vessel partly filled with mercury at 25°C. and atmospheric pressure. The volumetric rise in the level of mercury is a direct measure of the gross volume. This method is known as the mercury volumenometer method, and is described in the Encyclopedia of Chemical Technology, Vol. 4, page 892 (Interscience 1949).

Porous films have been produced which possess a micorporous, open-celled structure, and which are also characterized by a reduced bulk density. Films possessing this microporous structure are described, for example, in U.S. Pat. No. 3,426,754 which patent is assigned to the assignee of the present invention. The preferred method of preparation described therein involves drawing or stretching at ambient temperatures, i.e., "cold drawing", a crystalline, elastic starting film in an amount of about 10 to 300 percent of its original length, with subsequent stabilization by heat setting of the drawn film under a tension such that the film is not free to shrink or can shrink only to a limited extent.

While the above described microporous or void-containing film of the prior art is useful in this invention the search has continued for new processes able to produce open-celled microporous films having a greater number of pores, a more uniform pore concentration or distribution, a larger total pore area, and better thermal stability of the porous or voidy film.

An improved process for preparing open-celled microporous polymer films from non-porous, crystalline, elastic polymer starting films, includes (1) cold stretching, i.e., cold drawing the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat seting the resulting porous film under tension, i.e., at substantially constant length, to impart stability to the film. Yet another process is similar to this process but consolidates steps (2) and (3) into a continuous simultaneous, hot stretching-heat setting step, said step being carried out for a time sufficient to render the resulting microporous film substantially (less than about 15 percent) shrink resistant.

The elastic starting film or precursor film is preferably prepared from crystalline polymers such as polypropylene by melt extruding the polymer into a film, taking up the extrudate at a drawdown ratio giving an oriented film, and thereafter heating or annealing the oriented film if necessary to improve or enhance the initial crystallinity.

The essence of the improved processes is the discovery that the sequential cold stretching and hot stretching steps impart to the elastic film a unique open-celled structure which results in advantageous properties, including improved porosity, improved thermal stability and a gain or enhancement of porosity when treated with certain organic liquids such as perchloroethylene.

As determined by various morphological techniques or tests such as electron microscopy, the microporous films of the improved process are characterized by a plurality of elongated, non-porous, interconnecting surface regions or areas which have their axes of elongation substantially parallel. Substantially alternating with and defined by these non-porous surface regions are a plurality of elongated, porous surface regions which contain a plurality of parallel fibrils or fibrous threads. These fibrils are connected at each of their ends to the non-porous regions, and are substantially perpendicular to them. Between the fibrils are the pores or open cells of the films utilized by the present invention. These surface pores or open cells are substantially interconnected through tortuous paths or passageways which extend from one surface region to another surface area or region.

With such a defined or organized morphological structure, the films which are treated according to the instant process may have a grater proportion of surface area that the pores cover, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

In fact the total surface area per cubic centimeter of material of the films of this invention have a range of from 2 to about 200 square meters per cc. Preferably the range is from about 5 to about 100 square meters per cc. and most preferably from about 10 to about 80 square meters per cc. These values can be compared with normal pin-holed film which has a total surface area per gram of about 0.1 square meters and leather which has a value of about 1.6 square meters per cc. Additionally, the volume of space per volume of material ranges from about 0.05 to about 1.5 cubic centimeters per gram, preferably from about 0.1 to about 1.0 cubic centimeters per gram and most preferably from 0.2 to about 0.85 cubic centimeters per gram. Additional data to define the films of this invention relates to nitrogen flux measurements, wherein the microporous films have Q (or nitrogen) Flux values in the range of from about 5 to 400 preferably about 50 to 300. These values give an indication of porosity, with higher nitrogen flux values indicating higher levels of porosity.

Nitrogen flux may be calculated by mounting a film having a standard surface area of 6.5 square centimeters in a standard membrane cell having a standard volume of 63 cubic centimeters. The cell is pressurized to a standard differential pressure (the pressure drop across the film) of 200 pounds per square inch with nitrogen. The supply of nitrogen is then closed off and the time required for the pressure to drop to a final differential pressure of 150 pounds per square inch as the nitrogen permeates through the film is measured with a stop watch. The nitrogen flux, Q, in gram moles per square centimeter minute, is then determined from the equation:

$$Q = \frac{27.74 \times 10^3}{\Delta t \times T}$$

where $\Delta t$ is the change in time measured in seconds and T is the temperature of nitrogen in degrees Kelvin. The above equation is derived from the gas law, $PV = Z_n RT$.

The microporous films used in the present invention are formed from a starting elastic film of crystalline, film-forming, polymers. These elastic films have an elastic recovery at zero recovery time (hereinafter defined) when subjected to a standard strain (extension) of 50 percent at 25°C. and 65 percent relative humidity of at least about 40 percent, preferably at least about 50 percent, and most preferably at least about 80 percent.

Elastic recovery as used herein is a measure of the ability of a structure or shaped article such as a film to return to its original size after being stretched, and may be calculated as follows:

strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent and most preferably at least 50 percent, e.g., about 50 to 90 percent, or more. Percent crystallinity is determined by the x-ray method described by R. G. Quynn et al. in the Journal of Applied Polymer Science, Vol. 2 No. 5 pp 166–173 (1959). For a detailed discussion of crystallinity and its significance in polymers, see Polymers and Resins, Golding (D. Van Nostrand, 1959).

Preferred suitable starting elastic films, as well as the preparation thereof, are further defined in British Pat. No. 1,198,695, published July 15, 1970. Other elastic films which may be suitable for the practice of the present invention are described in British Pat. No. 1,052,500, published Dec. 21, 1966 and are well known in the art.

The starting elastic films utilized in the preparation of the microporous films of the present invention should be differentiated from films formed from classical elastomers such as the natural and synthetic rubbers. With such classical elastomers the stress-strain behavior, and particularly the stress-temperature relationship, is governed by entropy-mechanism of deformatin (rubber elasticity). The positive temperature coefficient of the retractive force, i.e., decreasing stress with decreasing temperature and complete loss of elastic properties at the glass transition temperatures, are particularly consequences of entropy-elasticity. The elasticity of the starting elastic films utilized herein, on the other hand, is of a different nature. In qualitative thermodynamic experiments with these elastic starting films, increasing stress with decreasing temperature (negative-temperature coefficient) may be interpreted to mean that the elasticity of these materials is not governed by entropy effects but dependent upon an energy term. More significantly, the starting elastic films have been found to retain their stretch properties at temperatures where normal entropy-elasticity could no longer be operative. Thus, the stretch mechanism of the starting elastic films is thought to be based on energy-elasticity relationships, and these elastic films may then be referred to as "non-classical" elastomers.

As stated, the starting elastic films employed in this invention are made from a polymer of a type capable of developing a significant degree of crystallinity, as constrasted with more conventional or "classical" elastic materials such as the natural and synthetic rubbers which are substantially amorphous in their unstretched or tensionless state.

A significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, $$\text{Elastic Recovery(ER)} = \frac{\text{(length when stretched)} - \text{(length after stretching} \times 100)}{\text{Length added when stretched}}$$

Although a standard strain of 50 percent is used to identify the elastic properties of the starting films, such 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1 or other relatively long chain alkenes, as well as copolymers of 3-methyl pentene-1 and any of the same n-alkenes mentioned previously in connection with 3-methyl butene-1. These polymers in the form of film should generally have a percent crystallinity of at least 20 percent, preferably at least 30 percent, and most preferably about 50 percent to 90 percent or higher.

For example, a film-forming homopolymer of polypropylene may be employed. When propylene homopolymers are contemplated, it is preferred to employ an isotactic polypropylene having a percent crystallinity as indicated above, a weight average molecular weight ranging from about 100,000 to 750,000 preferably about 200,000 to 500,000 and a melt index (ASTM-1958D-1238-57T, Part 9, page 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, one which contains recurring oxymethylene, i.e., —$CH_2$—O—, units interspersed with —OR— groups in the main polymer chain where R is a divalent radical containing at least 2 carbon atoms directly linked to each other and positioned in the chain between the two valences, with any substituents on said R radical being inert, that is, those which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,352 of Walling et al. These polymers in film form may also have a crystallinity of at least 20 percent, preferably at least 30 percent, and most preferably at least 50 percent, e.g., 50 to 60 percent or higher. Further, these polymers have a melting point of at least 150°C., and a number average molecular weight of at least 10,000. For a more detailed discussion of acetal and oxymethylene polymers, see Formaldehyde, Walker, pp. 175–191, (Reinhold 1964).

Other relatively crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and need not be described further herein for sake of brevity.

The types of apparatus suitable for forming the starting elastic films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw to the die from which it is extruded through a slot in the form of a film from which it is drawn by a take-up or casting roll. More than one take-up roll in various combinations or stages may be used. The die opening or slot width may be in the range, for example, of about 10 to 200 mils.

Using this type of apparatus, film may be extruded at a drawdown ratio of about 20:1 to 200:1, preferably 50:1 to 150:1.

The terms "drawdown ratio" or, more simply, "draw ratio", as used herein is the ratio of the film wind-up or take-up speed to the speed of the film issuing at the extrusion die.

The melt temperature for film extrusion, is in general, no higher than about 100°C. above the melting point of the polymer and no lower than about 10°C. above the melting point of the polymer.

For example, polypropylene may be extruded at a melt temperature of about 180° to 270°C., preferably 200° to 240°C. Polyethylene may be extruded at a melt temperature of about 175° to 225°C., while acetal polymers, e.g., those of the type disclosed in U.S. Pat. No. 3,027,352 may be extruded at a melt temperature of about 185° to 235°C., preferably 195° to 215°C.

The extrusion operation is preferably carried out with rapid cooling and rapid drawdown in order to obtain maximum elasticity. This may be accomplished by having the take-up roll relatively close to the extrusion slot, e.g., within 2 inches and, preferably, within 1 inch. An "air knife" operating at temperatures between, for example 0° and 40°C., may be employed within 1 inch of the slot to quench, i.e., quickly cool and solidify the film. The take-up roll may be rotated, for example, at a speed of 10 to 100 ft/min. preferably to 500 ft/min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide quick and effective cooling. Means such as cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the $D_1/D_2$ ratio, for example, 0.5 to 6.0 and preferably about 1.0 to about 2.5, and the take-up speed, for example, 30 to 700 ft/min. The melt temperature may be within the ranges given previously for straight slot extrusion.

The extruded film may then be initially heat treated or annealed in order to improve crystal structure, e.g., by increasing the size of the crystallites and removing imperfections therein.

In order to render the precursor or starting film microporous, it is subject to a process generally comprising the steps of stretching and heat setting the starting film. Preferably the process comprises either the consecutive steps of cold stretching, hot stretching and heat setting or the steps of cold stretching and simultaneously hot stretching and heat setting the precurosr film. Other variations on this process (such as elimination of the hot stretching step) can be carried out resulting in microporous films which, although slightly inferior to those films made by the cold stretch - hot stretch - heat set process, still find utility as the microporous films of this invention.

The term "cold stretching" as used herein is defined as stretching or drawing a film to greater than its original length and at a stretching temperature, i.e., the temperature of the film being stretched, less than the temperature at which the melting of the film begins when the film is uniformly heated from a temperature of 25°C. at a rate of 20°C. per minute. The terms "hot stretching" or "hot stretching-heat setting" as used herein is defined as stretching above the temperature at which melting begins when the film is heated from a temperature of 25°C. at a rate of 20°C. per minute, but below the normal melting point of the polymer, i.e., below the temperature at which fusion occurs. For example, using polypropylene elastic film, cold stretching is carried out preferably below about 120°C. while hot stretching or hot stretching-heat setting is carried out above this temperature.

When a separate heat setting step is employed it follows the cold stretching - heat stretching steps and is carried out at from about 125°C. up to less than the fusion temperature of the film in question. For polypropylene the range preferably is about 130° to 160°C.

The total amount of stretching or drawing which should occur when either a single stretching or consecutive stretching steps occur is in the range of about 10 to about 300 percent of the original length of the film prior to stretching.

The resulting microporous film exhibits a final crystallinity of preferably at least 30 percent, more preferably about 50 to 100 percent as determined by the aforementioned x-ray method and as previously defined an elastic recovery from a 50% strain of at least 50% preferably 60 to 85%. Furthermore, this film exhibits an average pore size of about 100 to 12,000 angstroms more usually 150 to 5,000 angstroms, the values being determined by mercury porosimetry as described in an article by R. G. Quynn et al., on pages 21–34 of Textile Research Journal, January 1963.

The films of the instant invention are then impregnated with a liquid possessing a high dielectric constant. A general impregnation method of the prior art consists of first vacuum drying the film to remove residual moisture. The drying temperature will vary depending on such factors as the length of the drying cycle; the film polymer, etc. but usually ranges from about 25°C. to 65°C. With too low a temperature, the drying speed is excessively long while too high a temperature may cause premature void coalescence. The film is then submerged in the dielectric impregnant preferably while still under vacuum for a time sufficient to insure complete saturation, i.e, through penetration of the liquid impregnant. Of course, once the film is submerged, pressure may be utilized to accelerate the impregnation process. The impregnated film, either after removal from the liquid or while still submerged, is subjected to elevated temperatures in the range of from about 70°C. to about 175°C., preferably from about 100°C. to about 160°C. depending on the polymer utilized, to heat-shrink the microporous film, thereby yielding a less permeable, compact, void-free final structure containing encapsulated dielectric fluid, i.e., a continuous though heterogenous dielectric system. It is to be noted that a partial shrinkage might be desirable at this stage of the process to enable a final heat-shrinkage to occur after an electrical unit such as a condenser is constructed.

This final heat shrinking of the impregnated film is usually accomplished by submerging the final electrical structure in a hot silicone oil bath, i.e., from approximately 110° to about 140°C. for a period of about 30 minutes.

This final heat-shrinking process is useful not only to force entrained air out of the final structure but also to lock the spacers firmly in place.

Illustrative of the various non-reactive oils that can be used for this bath are the fluorinated kerosenes, perfluoroaromatics, perfluoroamines, and high boiling hydrocarbon oils.

Capacitor devices embodying the present invention may, of course, have the same general configuration of presently known capacitors and the electrode foils may comprise one or more of a number of different materials, generally metallic, including for example aluminum; copper; zinc; tin; nickle; and tantalum.

Particularly suitable dielectric impregnants for the films of this invention are the perfluorobutyl amines and ethers, chlorinated aromatics such as Pyranol 1478 (a commercially available dielectric liquid composed primarily of trichlorobenzene), the perfluorohydrocarbons; the silicone oils; cottonseed oil (in limited application); mineral oil; castor oil; and mixtures thereof. With the polyolefins of the instant invention, a preferred impregnant is a halogenated organic material, being generally a compound having from 1 to 5 halogen substituents such as chlorine, and from 1 to 3 aryl groups. More specifically, a preferred impregnant is trichlorodiphenyl and commercially available as Pyranol 1499.

Often, the impregnation obtained by the teachings of this invention in combination with specific materials leads to a synergistic effect, the result of which increases the dielectric strength of the combination.

In addition to the solid dielectric films and the dielectric liquid with which they are impregnated, the systems of the present invention may also include numerous other components. In particular, it is often desirable to include a component to act as a stabilizer in the impregnated dielectric system. Generally, the purpose of having a stabilizer in the system is to neutralize certain contaminants or extraneous materials which may be present or which may be formed in the system. Such contaminants may include residual catalyst, or catalyst activators or neutralizers, which remain from the resin-forming reaction. Another source of such contaminants may include degradation products caused by environmental or voltage-induced chemical reaction in the system. These undesirable contaminants and extraneous products have an adverse effect on the dissipation or power factor of the impregnated dielectric system. Stabilizing agents have been found to be highly effective in stabilizing the power factor of an impregnated polymer dielectric system.

Examples of stabilizing agents are dipentene dioxide; 1-epoxyethyl-3,4-epoxycyclohexane (employed in dielectric liquids in amounts in the general range of 0.001% by weight to about 8.0% by weight) and particulate inorganic material, such as alumina.

As hereinabove indicated, the subject invention relates to the use of a unique open-celled microporous film as described above and in U.S. Ser. No. 876,511 filed Nov. 13, 1969 now abandoned and incorporated by reference, which application is assigned to the assignees of the instant invention, as an improved, synthetic, dielectric-liquid matrix. The following examples are illustrative of the desirable characteristics possessed by this film and are not intended to limit the present invention in any manner.

EXAMPLE I

Crystalline polypropylene having a melt index of 0.7 and a density of 0.92 is melt extruded at 230°C. through an 8 inch slit die of the coat hanger type using a 1 inch extruder with a shallow metering screw. The length to diameter ratio of the extruded barrel is 24/1. The extrudate is drawn down very rapidly to a melt drawdown ratio of 150, and contacted with a rotating casting roll maintained at 50°C. and 0.75 inches from the lip of the die. The film produced in this fashion is found to have the following properties: thickness, 0.001 inches, recovery from 50 percent elongation at 25°C., 50.3 percent, crystallinity, 59.6 percent.

A sample of this film is oven annealed in air with a slight tension at 140°C. for about 30 minutes, removed from the oven and allowed to cool. It is then found to have the following properties: recovery from a 50 percent elongation at 25°C., 90.5 percent; crystallinity 68.8 percent.

The annealed elastic film is first cold stretched at 25°C. and thereafter hot stretched at 145°C. Total stretch is 100 percent, based on the original length of the film, and the extension ratio is 0.90:1. The film is then heat set under tension, i.e., at constant length at 145°C. on 10 minutes in air.

The open-celled microporous film is then vacuum dried for ½ hour at 60°C. to remove residual moisture. While maintaining vacuum conditions the film is submerged in a mixture of 3 parts of Pyranol 1499 to 1 part of Pyranol 1478 (primarily trichlorobenzene). After complete submergence, the vacuum is broken and the impregnant bath temperature raised from ambient to about 65°C. for 15 minutes under pressure sufficient to suppress boiling. The thoroughly saturated film is then removed from the bath and heated to about 100°C. for 30 minutes to partially shrink the film and encapsulate the liquid impregnant.

Capacitor preforms are prepared utilizing two strips of the above prepared film 1 inch wide plates of two aluminum foils 0.25 mil thick and 1 inch wide and wound.

The final heat shrinkage is performed in an air oven at 120°C. for 30 minutes and terminals are attached by soldering.

The finished product exhibits CSV's in excess of 1500 volts with a dissipation factor measured at 1,000 cycles per second and 23°C. of approximately 0.58% and Capacitance (1 KC) of about 0.5 mfd.

EXAMPLE II

The wound capacitor of Example I is subjected to a final heatshrinkage by submerging it in a bath of the liquid impregnant under pressure and heating the bath to a temperature of approximately 110°C. for approximately 30 minutes. Properties similar to those in Example I are realized.

EXAMPLE III

The film forming polymer of this example, crystalline polyethylene having a density of 0.96 and a melt index of 0.7, is melt extruded at 195°C. through a 4 inch diameter annular die having an opening of 0.04 inches. The hot tube thus formed is expanded 1.5 times by internal air pressure and cooled by an air stream impinging on the film from an air ring located around and above the die. The extrusion is accomplished with an extruder of 24:1 length to diameter ratio and a shallow channel metering screw. The extrudate is drawn down to a drawdown ratio of 100:1 and passed through a series of rollers which collapses the tube. After windup the film is oven annealed in a tensionless state at 115°C. for 16 hours.

After removal from the oven, the film is allowed to cool, and stretched at an extension ratio of 0.80, by 50 percent of its original length with cold stretching being conducted at 25°C. and hot stretching being conducted at 115°C., and heat set in the oven at constant length for 5 minutes at 120°C., after which it is found to have the open-celled microporous structure of the present invention.

A condenser is produced by convolutely winding two aluminum foils 0.003 inches thick separated by two sheets of the above prepared microporous film. The foil was 1 inch wide and the film 1¼ inches wide. A total of 25 square inches of each foil is wound.

Terminals are attached by soldering. The unit is positioned within a polyester envelope with the electrode terminals extending therefrom. The envelope is heat-sealed about three sides of the condenser so that only the top remains open.

The unit is then vacuum dried for one hour at 40°C. to remove residual moisture. While maintaining vacuum conditions, the unit is submerged in a chlorinated organic dielectric, i.e. Chlorinol.

After complete submergence, the vacuum is broken and the impregnant bath temperature raised from ambient to about 40°C. for one hour under pressure sufficient to suppress boiling. The temperature of the bath is then raised to 75°C. for approximately 30 minutes to partially shrink the polyethylene matrix and encapsulate the dielectric liquid. At this time a heat sealing mechanism seals the envelope across the top.

A final heat shrinkage, which not only encapsulates the dielectric fluid within the microporous spaces and tightens the windings but also heat shrinks the envelope to conform tightly to the shape of the condenser, takes place within the bath by sustaining a temperature of approximately 80°C. for 30 minutes. The resulting unit exhibits breakdown voltages in excess of 1500 volts.

In addition, the electrical units envisioned utilizing the dielectric insulation of the instant invention may be hermetically sealed in a casing and/or dipped in a hardening dielectric material to seal the units from dust and undesirable atmospheres.

As illustrated in the previous examples, dielectric impregnation can be effected quite rapidly either before or after the various laminations of a condenser are assembled. Where the film is utilized as electrical cable insulation, it is preferred to impregnate before lay-up.

The instant invention also contemplates the use of the open-cell microporous film as a dielectric substrate/wick for sprayed-on, non-woven polypropylene to produce a dielectric insulation matrix capable of entraining a greater volume of dielectric fluid than that of the microporous film alone.

Our invention may be applied in a number of different fields, but is particularly suitable for the treatment of impregnatable electrical assemblies. Electrical condensers, coils, chokes, transformers, cables, etc., are among the devices for which the invention is especially adapted. The preparation of improved electrical condensers and cables represents the preferred embodiments of the invention.

What is claimed is:

1. An electrical conductor having a dielectric insulation layer for retarding the discharge of electrical charges comprising a partially heat-shrunk open-celled microporous film comprised of a polymer selected from polyolefins, polyacetals, polyamides, polyesters, polyalkylene sulfides and polyarylene oxides having a reduced bulk density as compared to the bulk density of the corresponding polymer films having no open-celled structure, a crystallinity of above about 20 pecent, a pore size of about 100 to 12,000 Angstroms, a pre-impregnation nitrogen flux of about 5–400, and an elastic recovery at 50 percent extension of greater than 40% and said polymer film impregnated with a dielectric liquid selected from a halogenated organic compound having from 1 to 5 halogen substituents and from 1 to 3 aryl groups; perfluorobutylamines and ethers; perfluorohydrocarbons; silicone oils; mineral oils; castor oil; and cottonseed oil, said dielectric liquid being in contact with said electrical conductor.

2. An electrical conductor having a dielectric insulation according to claim 1 wherein said microporous film has a bulk density of about 50 to 75 percent of the bulk density of corresponding polymer films having no open-celled structure, a nitrogen flux of at least 40, and a surface area of at least 30 sq. m/cc.

3. A method for retarding the discharge of electrical charges which comprises placing a partially heat-shrunk open-celled microporous polymer film in contact with an electrical conductor to insulate said electrical conductor, said polymer film comprising a polymer selected from polyolefins, polyacetals, polyamides, polyesters, polyalkylene sulfides and polyarylene oxides having a reduced bulk density as compared to the bulk density of the corresponding polymer films having no open-celled structure, a crystallinity of above about 20 percent, a pore size of about 100 to 12,000 Angstroms, a pre-impregnation nitrogen flux of about 5–400, and an elastic recovery at 50 percent extension of greater than 40% and said polymer film impregnated with a dielectric liquid selected from a halogenated organic compound having from 1 to 5 halogen substituents and from 1 to 3 aryl groups; perfluorobutylamines and ethers; perfluorohydrocarbons; silicone oils; mineral oils; castor oil and cottonseed oil, said dielectric liquid being in contact with said electrical conductor.

4. The method of claim 3, wherein said microporous film has a bulk density of about 50 to 75% of the bulk density of coresponding polymer films having no open-celled structure, a nitrogen flux of at least 40, and a surface area of at least 30 sq. m/cc.

* * * * *